US012294152B2

(12) United States Patent
Igarashi et al.

(10) Patent No.: US 12,294,152 B2
(45) Date of Patent: May 6, 2025

(54) RADIO FREQUENCY MODULE AND WIRELESS DEVICE

(71) Applicant: SONY SEMICONDUCTOR SOLUTIONS CORPORATION, Kanagawa (JP)

(72) Inventors: Takahiro Igarashi, Kanagawa (JP); Shusaku Yanagawa, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 211 days.

(21) Appl. No.: 17/904,671

(22) PCT Filed: Jan. 18, 2021

(86) PCT No.: PCT/JP2021/001512
§ 371 (c)(1),
(2) Date: Aug. 19, 2022

(87) PCT Pub. No.: WO2021/171830
PCT Pub. Date: Sep. 2, 2021

(65) Prior Publication Data
US 2023/0099457 A1 Mar. 30, 2023

(30) Foreign Application Priority Data
Feb. 27, 2020 (JP) ................................ 2020-031766

(51) Int. Cl.
*H01Q 21/06* (2006.01)
*H01Q 1/52* (2006.01)
*H01Q 15/00* (2006.01)

(52) U.S. Cl.
CPC ........... *H01Q 21/065* (2013.01); *H01Q 1/523* (2013.01); *H01Q 15/008* (2013.01); *H01Q 15/0086* (2013.01)

(58) Field of Classification Search
CPC .......... H01Q 1/523; H01Q 3/26; H01Q 15/00; H01Q 15/008; H01Q 15/0086; H01Q 21/061; H01Q 21/065
See application file for complete search history.

(56) References Cited

U.S. PATENT DOCUMENTS

2016/0028161 A1* 1/2016 Kawaguchi .......... H01Q 15/008
343/700 MS
2018/0226727 A1* 8/2018 Sato ....................... H01Q 21/28
(Continued)

FOREIGN PATENT DOCUMENTS

JP 09-051224 A 2/1997
JP H-0951224 A * 2/1997
(Continued)

OTHER PUBLICATIONS

Adela, et al., "High-Isolation Array Antenna Integration for Single-Chip Millimeter-Wave FMCW Radar", IEEE Transactions on Antennas and Propagation, vol. 66, No. 10, Oct. 1, 2018, pp. 5214-5223.
(Continued)

*Primary Examiner* — Dameon E Levi
*Assistant Examiner* — Leah Rosenberg
(74) *Attorney, Agent, or Firm* — CHIP LAW GROUP

(57) ABSTRACT

The present invention provides a radio frequency module including: an interposer; a plurality of antenna element groups that include first electrodes and a second electrode and are configured such that the first electrodes are aligned in line shapes in at least a first direction on a first surface of the interposer; and meta material portions that are provided at the interposer and affect electromagnetic properties of the plurality of antenna elements. The meta material portions include electromagnetic band gap structures provided by forming predetermined geometric patterns near both sides of the first electrodes along at least the first direction. The radio
(Continued)

frequency module can thus have a reduced size and a broad band/a high gain.

15 Claims, 12 Drawing Sheets

(56) References Cited

U.S. PATENT DOCUMENTS

| | | | | |
|---|---|---|---|---|
| 2019/0051977 | A1* | 2/2019 | Kawaguchi | G01S 13/931 |
| 2019/0229398 | A1* | 7/2019 | Ryoo | H01Q 1/243 |
| 2019/0312347 | A1 | 10/2019 | Edwards et al. | |
| 2020/0106188 | A1* | 4/2020 | Ou | H01Q 21/065 |
| 2020/0358173 | A1* | 11/2020 | Jong | H01Q 1/243 |
| 2021/0028559 | A1* | 1/2021 | Hwang | H01Q 15/0086 |
| 2021/0029821 | A1* | 1/2021 | Hwang | H01Q 15/008 |
| 2021/0066813 | A1* | 3/2021 | Salman | H01Q 5/371 |

FOREIGN PATENT DOCUMENTS

| | | | |
|---|---|---|---|
| JP | 2003283239 | A | * 10/2003 |
| JP | 2019-140644 | A | 8/2019 |
| WO | 2017/064856 | A1 | 4/2017 |

OTHER PUBLICATIONS

International Search Report and Written Opinion of PCT Application No. PCT/JP2021/001512, issued on Feb. 16, 2021, 11 pages of ISRWO.

* cited by examiner

RADIO FREQUENCY MODULE AND WIRELESS DEVICE

CROSS REFERENCE TO RELATED APPLICATIONS

This application is a U.S. National Phase of International Patent Application No. PCT/JP2021/001512 filed on Jan. 18, 2021, which claims priority benefit of Japanese Patent Application No. JP 2020-031766 filed in the Japan Patent Office on Feb. 27, 2020. Each of the above-referenced applications is hereby incorporated herein by reference in its entirety.

TECHNICAL FIELD

The present technique relates to a radio frequency (RF) module and a wireless device.

BACKGROUND ART

Millimeter wave radars that irradiate objects (targets) with radio waves (millimeter waves) in the 30 to 300 GHz band for sensing are known. The millimeter wave radars can measure, for example, distances and the like to objects with high accuracy. In recent years, the role of millimeter wave radars has become important with an increase in demand for an improvement in safety in automobiles and automated driving techniques. Radio frequency modules or devices adapted for millimeter wave radars are configured to include transmission/reception antenna elements and semiconductor chips for processing various signals in general.

As an antenna used for a millimeter wave radar, there is a patch array antenna in which a plurality of antenna elements are arranged in an array shape. The patch array antenna can change directionality by providing a signal with a different phase and an amplitude to each antenna element. For example, PTL 1 below discloses a technique of controlling directionality by aligning antenna elements in one direction on a dielectric substrate and changing a phase difference between a first high-frequency signal and a second high-frequency signal which is supplied to the antenna elements.

CITATION LIST

Patent Literature

[PTL 1]
WO 2017/064856

SUMMARY

Technical Problem

For a patch array antenna, decrease in size is required, and broad bandwidth/high gain operation characteristics are also required. Since it is not possible to secure a gain with a reduced array size of a patch array antenna, and it is necessary to provide an amplifier circuit, securing a gain for the amplifier circuit is limited in terms of design due to a relation with power consumption. Also, since the patch array antenna uses resonance of antenna elements, frequency bands of the individual antenna elements are typically narrow, and it is necessary to increase the array size in order to widen the band while securing the gain. It is thus difficult to satisfy having both these requirements together for patch array antennas.

Thus, an object of the present disclosure is to provide a radio frequency module with a reduced size and a broad band/a high gain in view of the aforementioned circumstances.

More specifically, an object of the present disclosure is to provide a radio frequency module with a reduced size and a broad band/a high gain through effective arrangement of a meta material and antenna elements.

Also, an object of the present disclosure is to reduce the numbers of peripheral circuits and wirings by reducing the number of antenna elements while securing a broad band/high gain and thereby to provide a radio frequency module that has a reduced size and a simple structure as a whole.

Also, an object of the present disclosure is to provide a radio frequency module with a structure in which other active elements can efficiently arranged in the surroundings thereof while securing a reduced size and a broad band/a high gain.

Solution to Problem

A technique according to the present disclosure in accordance with a certain viewpoint is a radio frequency module including; an interposer; a plurality of antenna element groups that include first electrodes and a second electrode, and configured such that the first electrodes are aligned in line shapes in at least a first direction on a first surface of the interposer; and meta material portions that are provided on the interposer and affect electromagnetic properties of the plurality of antenna elements. The meta material portions include electromagnetic band gap structures provided by forming predetermined geometric patterns near both sides of the first electrodes along at least the first direction.

Also, a technique according to the present disclosure in accordance with another viewpoint is a wireless device including: a radio frequency module; and a wireless control circuit that is electrically coupled to the radio frequency module. The radio frequency module includes an interposer, a plurality of antenna elements that include first electrodes and a second electrode and are configured to include, on a first surface of the interposer, a first antenna element group in which the first electrodes are aligned in line shapes in a first direction and a second antenna element group in which the first electrodes are aligned in line shapes in a second direction that is orthogonal to the first direction, and meta material portions that are provided at the interposer and affect electromagnetic properties of the plurality of antenna elements. The meta material portions include electromagnetic band gap structures provided to form predetermined geometric patterns near both sides of the first electrodes of the plurality of antenna elements along each of the first direction and the second direction. Also, the first antenna element group and the second antenna element group share an antenna element at a mutually intersecting position. On the other hand, the wireless control circuit includes a phase shifter that is electrically coupled to each of the plurality of antenna elements, and a control unit that controls the phase shifter such that phases of signals for the plurality of antenna elements are changed. The control unit performs control such that a signal having a phase with a deviation of 90 degrees with respect to a phase of a signal to be supplied to power supply points of one of the antenna element groups is supplied to the power supply point of the antenna element at the mutually intersecting position.

Note that, means/unit in the specification and the like do not simply mean physical means/unit and also include a case in which functions that the means/unit have are realized by software. Also, functions that one means/unit have may be realized by two or more physical means/units, or functions of two or more means/units may be realized by one physical means/unit.

Also, the "system" refers to a logical group of a plurality of devices (or functional modules that realize specific functions), and there is no particular limitation as to whether or not each of the devices and the functional modules is in a single casing.

Other technical features, purposes, and effects or advantages of the present technique will become apparent through the following embodiments, which will be described with reference to the accompanying drawings. The effects described in the present disclosure are merely illustrative examples and are not limited thereto, and there may be other effects.

DESCRIPTION OF EMBODIMENTS

Embodiments of the present technique will be described below with reference to the drawings. However, the embodiments described below are just illustrative examples and are not intended to exclude various modifications and applications of techniques which will not explicitly be described below. The present technique can be implemented with various modifications (such as combinations of the embodiments, for example) without departing from the gist thereof. In the following description of the drawings, the same or similar portions are denoted with the same or similar reference signs. Also, the drawings are schematically illustrated and do not necessarily coincide with actual dimensions, ratios, and the like. In addition, the drawings include portions where dimensional relationships and ratios differ between the drawings in some cases.

Figure 1:
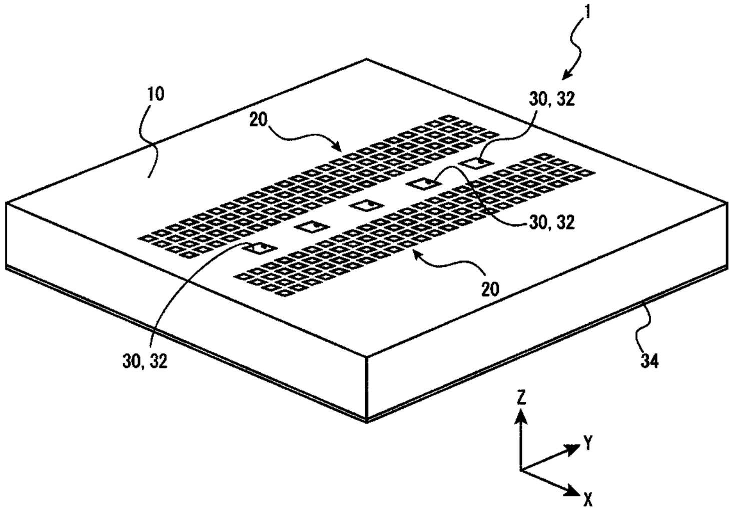
FIG. 1 is a perspective view illustrating an example of an appearance configuration of a radio frequency module according to an embodiment of the present technique.

FIG. 1 is a perspective view illustrating an example of an appearance configuration of a radio frequency module according to an embodiment of the present technique. As illustrated in the drawing, a radio frequency module 1 is configured to include a meta material portion 20 and a plurality of antenna elements 30 arranged on an interposer 10. The radio frequency module 1 may be configured for transmission and for reception, respectively, or may be configured to perform both transmission and reception and may be configured to be switched by a switching mechanism, for example.

The interposer 10 functions as a dielectric substrate for the antenna and can be configured of an organic material such as glass or an epoxy resin or an inorganic material such as silicon, for example. In the present disclosure, the interposer 10 is assumed to be a glass interposer (GIP). The GIP does not release any organic gases and thus has an advantage that it is not necessary to consider a pattern for pulling out the released organic gas. The shape and the size of the interposer 10 determine the shape of the appearance of the radio frequency module 1. Although the interposer 10 is formed into a rectangular plate shape in the present disclosure, the present disclosure is not limited thereto, and other shapes may be adopted.

Figure 2:
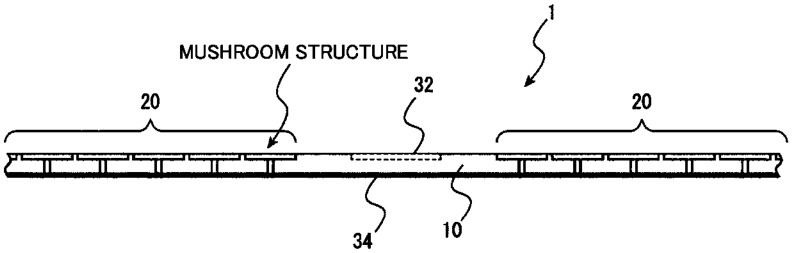
FIG. 2 is a diagram for explaining an EBG structure in the radio frequency module according to the embodiment of the present technique.

The meta material portion 20 is a structure as a "meta material" with a concept of allowing an electromagnetic phenomenon of improving antenna properties (electromagnetic properties) through increases in capacitance and inductance. The electromagnetic phenomenon of improving the antenna properties can be an electromagnetic phenomenon of a medium in which a dielectric constant and a magnetic permeability become negative at the same time, for example. The antenna using such a meta material may be called a meta material antenna. Although the meta material portion 20 is, for example, a periodic structure with a frequency band of blocking radio waves (band gap), for example, an electromagnetic band gap (EBG) structure, the present disclosure is not limited thereto. Although the meta material portion 20 is assumed to be an EBG structure with a mushroom structure in the present disclosure, the present disclosure is not limited thereto. For example, the meta material portion 20 may be an EBG structure with a corrugated structure. FIG. 2 is a diagram for explaining an example of the mushroom structure in the EBG structure. With the EBG structure having such a mushroom structure, it is possible to achieve a decrease in thickness of the radio frequency module 1, curbing of interconnection between the antenna elements 30, an increase in gain, and the like in addition to facilitation of manufacturing based on existing circuit processing techniques. As illustrated in FIG. 1, the meta material portion 20 in this example is configured such that the individual mushroom structures are aligned to form a strip-shaped or thin and long rectangular geometric pattern with two strip-shaped geometric patterns separated from each other and parallel to each other.

Each of the plurality of antenna elements 30 is a micro-strip antenna (also called a patch antenna). Each antenna element 30 is configured to include a patch electrode 32 that is a first electrode formed on a first surface (for example, a front surface) of the interposer 10, a ground electrode 34 that is a second electrode formed on a second surface (for example, a rear surface) of the interposer 10, and a power supply point 36 (see FIG. 3). In the example illustrated in the drawing, a plurality of (five in this example) antenna elements 30 are configured with the patch electrodes 32 arranged in a line in a region formed between two mushroom structure groups. In other words, the plurality of antenna elements 30 are aligned in line shapes along the longitudinal axis direction of EBG structures between two EBG structures forming strip-shaped geometric patterns. Note that in the present disclosure, the alignment direction of the patch electrodes 32 may also simply be referred to as an alignment direction of the antenna elements 30. Also, although the geometric patterns of the EBG structures in this example are strip shapes, and the meta materials (mushroom structures) are thus not formed in the region in the alignment direction of the plurality of antenna elements 30 (the extending direction from each of the antenna elements 30 at both ends), the present disclosure is not limited thereto, and the meta material may be formed in this region.

Figure 3:
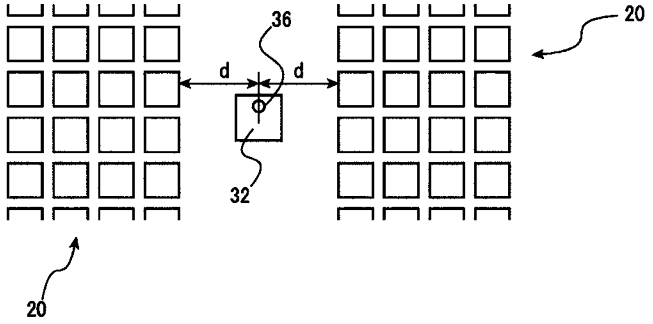
FIG. 3 is a diagram for explaining a positional relationship between antenna elements and the EBG structure in the radio frequency module according to the embodiment of the present technique.

The positions of the power supply points 36 on the patch electrodes 32 are appropriately determined in consideration of antenna properties of the radio frequency module 1. In the present disclosure, the positions of the power supply points 36 are determined to be at substantially equal distances from end portions of the EBG structures on both the sides as illustrated in FIG. 3. Also, the distance between the power supply points 36 depends on the wavelength of the electromagnetic waves as targets of the radio frequency module 1.

Figure 4:
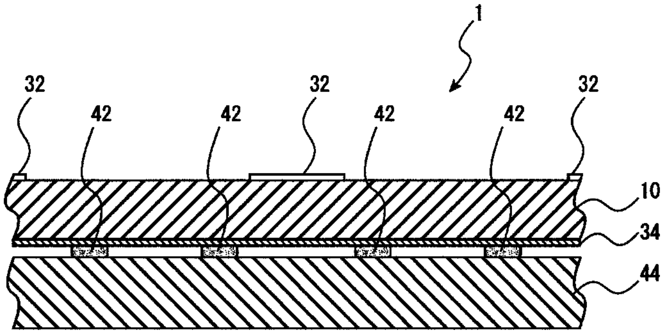
FIG. 4 is a partial sectional view illustrating an example of a configuration of the radio frequency module according to the embodiment of the present technique.

Note that as illustrated in FIG. 4, an IC substrate 44 including a predetermined electronic circuit element may be provided on the side of the rear surface (that is, the side of the ground electrode 34) of the radio frequency module 1 via a bump 42, for example. Alternatively, a predetermined electronic circuit element may be formed in a predetermined region sectioned by the EBG structures on the interposer 10 as illustrated in another example. Additionally, a solid metal structure may be formed of a predetermined metal material over the entire surface or a part of the surface of the radio frequency module 1 on the side of the rear surface.

With the radio frequency module 1 that is a 1×5 array antenna adopting an EBG-type meta material as described above, a gain of about 17.1 dBi can be obtained as a result of simulation. On the other hand, a gain of a 5×5 array antenna, for example, in the related art that does not adopt a meta material is about 18.6 dBi. Therefore, even in a case in which the number of antenna elements 30 is small, it is possible to secure a sufficient gain by effectively arranging the meta material portions 20 having specific geometric patterns. Note that in such a radio frequency module 1, a radiation angle (3 dB beam width) in the alignment direction (the Y direction in FIG. 1) of the plurality of antenna elements 30 is narrower than the radiation angle in a direction (the X direction in the drawing) that is orthogonal to the alignment direction. The radiation angle is an angle between points where a radiation intensity is lower than that in a direction in which a radiation intensity of the electromagnetic waves radiated from the antenna (or reception sensitivity of the antenna) is a maximum by 3 dBi. In this example, the radiation angle in the alignment direction of the antenna elements 30 is about 20 degrees, and the radiation angle in the direction that is orthogonal to the alignment direction is about 30 degrees. This is because the radiation angle becomes narrow due to a superimposition effect of mutual antenna elements 30 in the alignment direction of the antenna elements 30 while there is no such a superimposition effect in the orthogonal direction.

The radio frequency module 1 illustrated in FIG. 1 is configured such that the plurality of antenna elements 30 are aligned in line shapes, and there is thus an antenna property that the radiation angle of each antenna element 30 is smaller in the alignment direction thereof and is larger in the direction orthogonal thereto. Hereinafter, the radio frequency module 1 with a configuration for two-dimensionally securing a high gain will be described.

Figure 5:
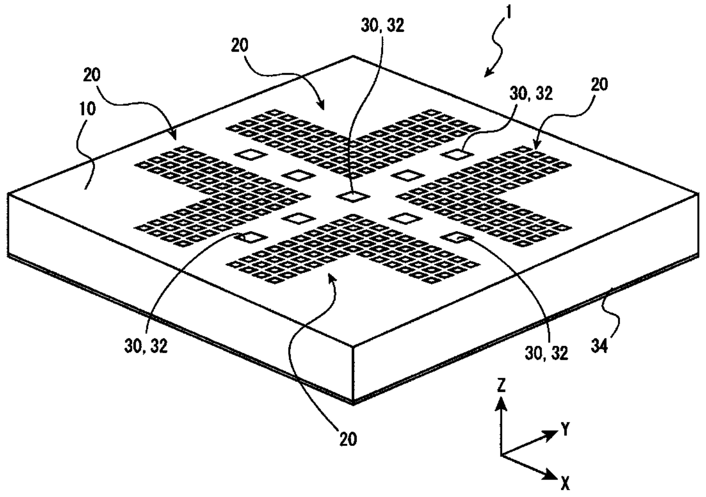
FIG. 5 is a perspective view illustrating another example of the appearance configuration of the radio frequency module according to the embodiment of the present technique.

FIG. 5 is a perspective view illustrating another example of an appearance configuration of the radio frequency module according to an embodiment of the present technique. Also, FIGS. 6A and 6B are plan views illustrating an example of the appearance configuration of the radio frequency module according to the embodiment of the present technique, and positions of power supply points are different in FIGS. 6A and 6B as will be described later.

As illustrated in FIG. 5, the radio frequency module 1 in this example includes a plurality of antenna elements 30 aligned in a cross shape and includes meta material portions 20 formed in the vicinity thereof along the alignment of the antenna elements 30.

The plurality of antenna elements 30 include a first antenna element group aligned in a line shape in the X direction and a second antenna element group aligned in a line shape in the Y direction that is orthogonal to the X direction. In this example, nine antenna elements 30 are provided with the antenna element 30 at the intersecting position at the center shared. The positions of the power supply points 36 on the patch electrodes 32 are determined to be at substantially equal distances from the EBG structures on both the sides (see FIG. 3).

Figure 6A:
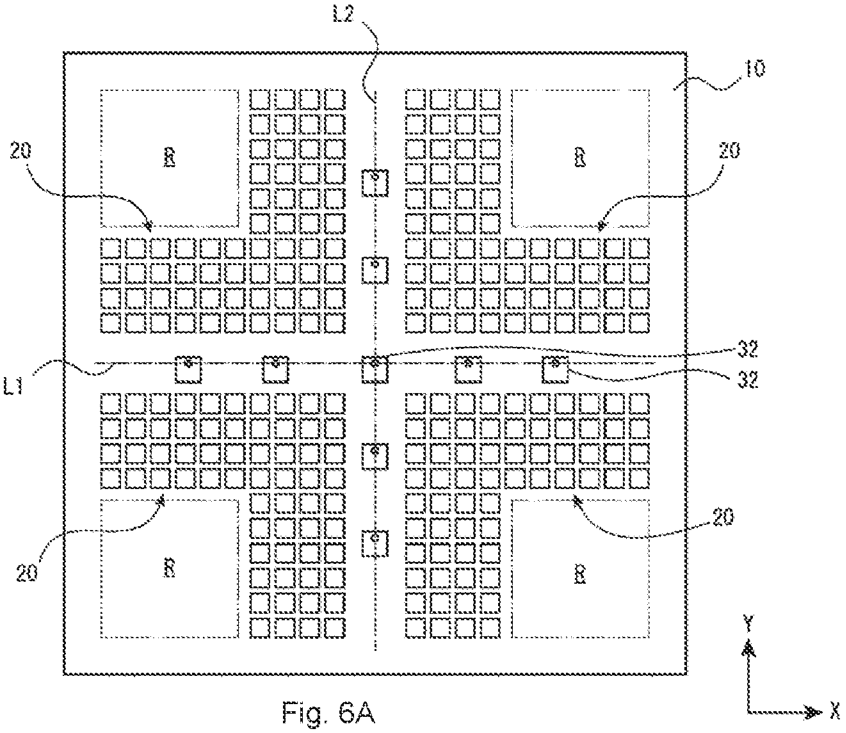
FIGS. 6A and 6B are plan views illustrating an example of the appearance configuration of the radio frequency module according to the embodiment of the present technique.
Figure 6B:
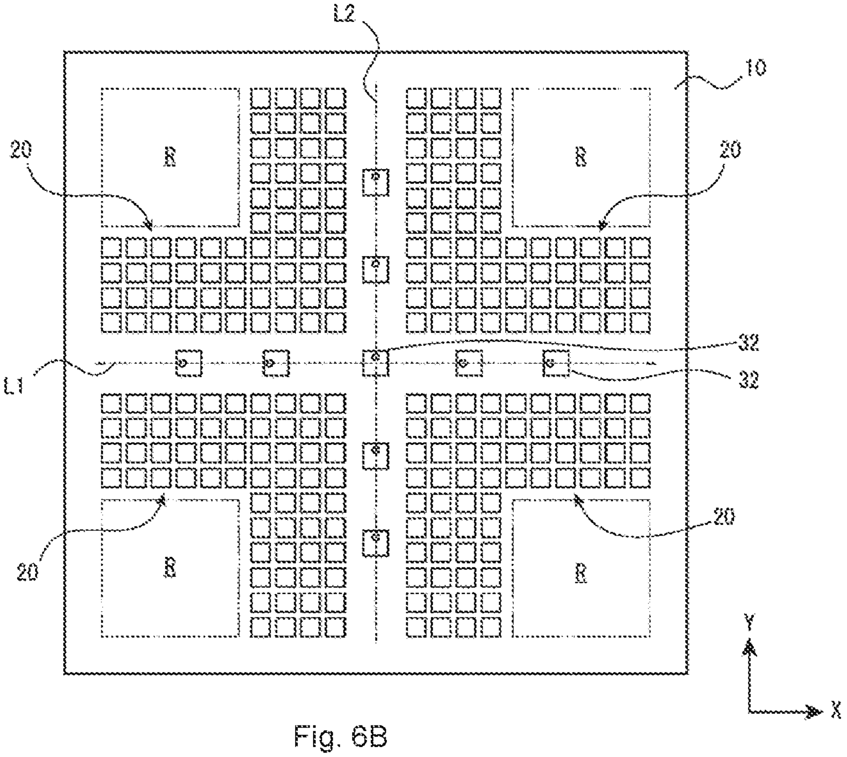
Figure 7:
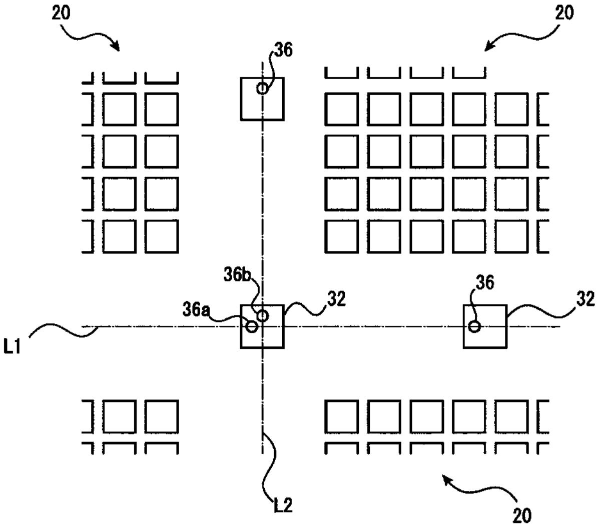
FIG. 7 is a diagram for explaining the antenna elements in the radio frequency module according to the embodiment of the present technique.

More specifically, in the example illustrated in FIG. 6A, the positions of the power supply points 36 of the antenna elements 30 aligned in the X direction (transverse direction) are aligned in a line on a virtual line L1, and the positions of the power supply points 36 of the antenna elements 30 aligned in the Y direction (longitudinal direction) are aligned in a line on a virtual line L2 to conform to the position of the power supply point 36 of the antenna element 30 at the intersecting position at the center portion. Also, in the example illustrated in FIG. 6B, the positions of the power supply points 36 of the antenna elements 30 aligned in the X direction (transverse direction) are aligned in a line on the virtual line L1, and the positions of the power supply points 36 of the antenna elements 30 aligned in the Y direction (longitudinal direction) are aligned in a line on the virtual line L2 to conform to the position of the power supply point 36 of the antenna element 30 at the intersecting position at the center portion. In this case, the power supply point of the antenna element 30 at the intersecting position at the center portion and the power supply points 36 of remaining antenna elements 30 are not aligned in the virtual line (the virtual line L1 in this example) in the X direction. Therefore, a signal having a phase with a deviation of 90 degrees with respect to the signal for the remaining antenna elements 30 is used for the antenna element 30 at the intersecting position at the center via the power supply point 36 thereof. Alternatively, two power supply points 36*a* and 36*b* may be provided instead of using the signal having a phase with a deviation of 90 degrees as illustrated in FIG. 7. Note that although the shared antenna element 30 is located at the middle of the antenna elements 30 aligned in each of the X and Y directions in this example, the present disclosure is not limited thereto, and an antenna element 30 at a position deviated from the center portion may be shared.

In regard to the meta material portions 20, the meta material portions 20 are formed in the vicinity of and along the plurality of antenna elements 30 aligned in a cross shape. In this example, the meta material portions 20 are configured by four groups of EBG structures forming L-shaped geometric patterns being point-symmetrically disposed with separation from each other. Also, a predetermined region R formed by an EBG structure 20*a* forming an L-shaped geometric pattern on the distal side from the plurality of antenna elements 30 is illustrated. A circuit that configures an entirety or a part of a wireless control circuit, which will be described later, for example, can be arranged in the predetermined region (element region) R.

Figure 8:
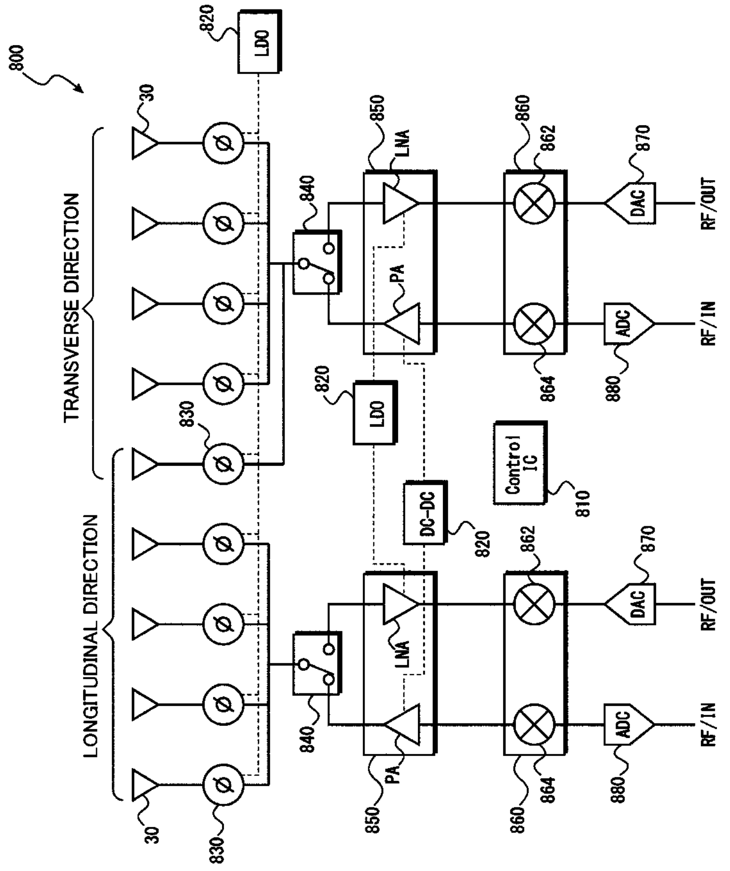
FIG. 8 is a block diagram of a wireless control circuit adapted for the radio frequency module according to the embodiment of the present technique.

FIG. 8 is a block diagram of the wireless control circuit that is adapted for the radio frequency module according to the embodiment of the present technique. The drawing illustrates, as an example, a wireless control circuit adapted for the radio frequency module 1 including the plurality of antenna elements 30 that are aligned in line shapes in each of the longitudinal direction and the transverse direction (that is, the cross shape) illustrated in FIG. 5.

As illustrated in the drawing, the wireless control circuit 800 is configured to include a control IC 810, a power source 820, phase shifters 830, a switch 840, a signal amplifier 850, a frequency modulator 860, an analog-digital converter (ADC) 870, and a digital-analog converter (DAC) 880.

The control IC 810 is a circuit that is electrically connected to the radio frequency module 1 and collectively controls the wireless control circuit 800. The control IC 810 can be configured as a programmable IC such as a field-programmable gate array, for example. In the present disclosure, the control IC 810 is an aspect of a control unit. For example, the control IC 810 performs control for shifting the phase of the signal for the phase shifters 830. In this manner, the radio frequency module 1 can control the direction and the sidelobe level of radiation beams of the antenna elements 30. Such control is known as beam steering control of the antenna arrays. Also, the control IC 810 performs control for switching the switch 840 to switch between transmission/reception operations of the radio frequency module 1.

Each of the plurality of phase shifters 830 is connected to one antenna element 30 and shifts the phase of the signal to/from the antenna element 30 under control of the control IC 810. For example, the control IC 810 performs control to deviate the phase of the signal of the phase shifter 830 connected to the antenna element 30 at the intersecting position at the center by 45 to 90 degrees, for example, with respect to the phase shifter 830 connected to the other antenna elements 30. The phase shifter 830 is driven by the power source 820 such as a low-drop-out regulator (LDO), for example.

The switch 840 is a switch for connecting each of the antenna elements 30 aligned in the longitudinal direction and the transverse direction. Although the switch 840 is configured of an MOSFET, for example, the present disclosure is not limited thereto. The switch 840 is switched in a time-division manner under control of the control IC 810.

The signal amplifier 850 amplifies input signals. Although a power amplifier (PA) that is driven by a DC-DC power source 820 is used for transmission and a low-noise amplifier driven by an LDO power source 820 is used for reception, for example, as the signal amplifier 850, the present disclosure is not limited thereto.

The frequency modulator 860 performs frequency modulation on input signals on the basis of clock signals supplied from a PLL circuit (not illustrated), for example. The frequency modulator 860 is configured to include an up converter 862 and a down converter 864, for example. The up converter 762 converts a low-frequency signal into a transmittable high-frequency signal. Also, the down converter 864 converts a received high-frequency signal into a low-frequency signal such that it is possible to perform internal processing thereon.

The ADC 870 converts a received analog signal into a digital signal and outputs the digital signal to an internal circuit, which is not illustrated. Also, the DAC 880 converts an input digital signal into an analog signal and outputs the analog signal to the up converter 862.

Note that although not illustrated in the drawing, the antenna element 30 at the intersecting position at the center is connected to a Wilkinson distributor, for example. Although phase shifters 830 are needed in accordance with the number of antenna elements 30, in general, it is possible to adopt a configuration in which the antenna elements 30 aligned in line shapes perpendicularly intersect each other in the present embodiment, and it is thus possible to reduce the number of antenna elements 30 and thereby to reduce the number of phase shifters 830 as well and to reduce power consumption.

As described above, the radio frequency module 1 in this example includes the plurality of antenna elements 30 aligned in a line shape in each of the X direction and the Y direction that is orthogonal to the X direction and meta material portions 20 with EBG structures aligned in the vicinity thereof along the alignment of the plurality of antenna elements 30. Therefore, the radiation angles in both the X direction and the Y direction become the same, and further, it is possible to two-dimensionally secure a high gain.

Other Modification Examples

Figure 9:
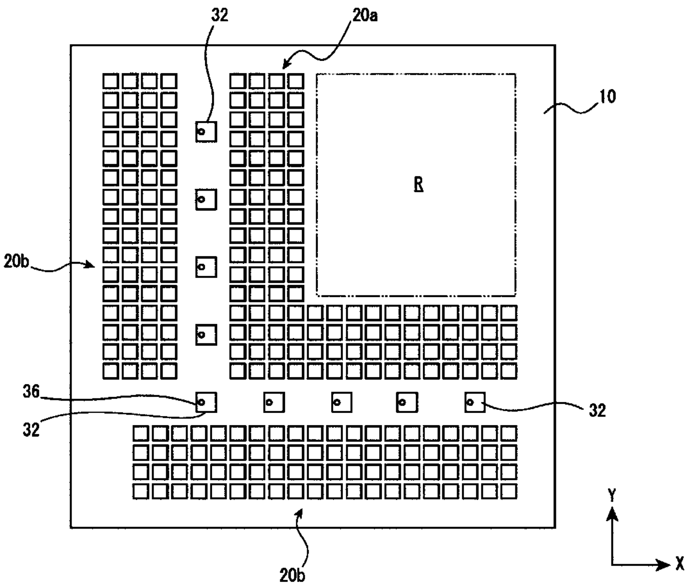
FIG. 9 is a plan view illustrating another example of the appearance configuration of the radio frequency module according to the embodiment of the present technique.

FIG. 9 is a plan view illustrating another example of the appearance configuration of the radio frequency module according to the embodiment of the present technique. As illustrated in the drawing, the radio frequency module 1 in this example includes a plurality of antenna elements 30 aligned in an L shape and includes meta material portions 20 in the vicinity of and along the alignment of the antenna elements 30.

In other words, the plurality of antenna elements 30 include a first antenna element group aligned in a line shape in the X direction and a second antenna element group aligned in a line shape in the Y direction that is orthogonal to the X direction. In this example, nine antenna elements 30 aligned in an L shape are provided with the antenna element 30 at the position at which the first and second antenna element groups intersect each other at one end portion of each of the first and second antenna element groups shared. Therefore, the shared antenna element 30 is located at the position deviating from the center of the interposer 10. The positions of the power supply points 36 on the patch electrodes 32 are determined to be at substantially equal distances from the EBG structures on both the sides as described above.

In regard to the meta material portions 20, the meta material portions 20 are formed in the vicinity of and along the plurality of antenna elements 30 aligned in the L shape.

For example, the meta material portions 20 are configured to include one EBG structure 20*a* formed into an L-shaped geometric pattern and two EBG structures 20*b* formed into strip-shaped geometric patterns. Although the two EBG structures 20*b* are formed with separation from each other in this example, one L-shaped EBG structure like the EBG structure 20*a* may be configured along the outer side of the plurality of antenna elements 30 aligned in the L shape, for example.

Also, the drawing illustrates a predetermined region R sectioned and formed by the EBG structure 20*a* forming the L-shaped geometric pattern on the distal side of the plurality of antenna elements 30. In this example, the plurality antenna elements 30 are aligned in the L shape, the shared antenna element 30 is located at a position deviating from the center of the interposer 10, and the predetermined region R can be maximized. It is thus possible to efficiently arrange a circuit element including an active element and the like configuring an entirety or a part of the wireless control circuit as illustrated in FIG. 7, for example, in the predetermined region R.

Moreover, it is possible to efficiently arrange a wireless device including such a radio frequency module 1 including the antenna elements 30 aligned in the L shape at a corner portion of a circuit substrate provided inside a device such as a smartphone, for example, which contributes to further size reduction of the device.

Figure 10:
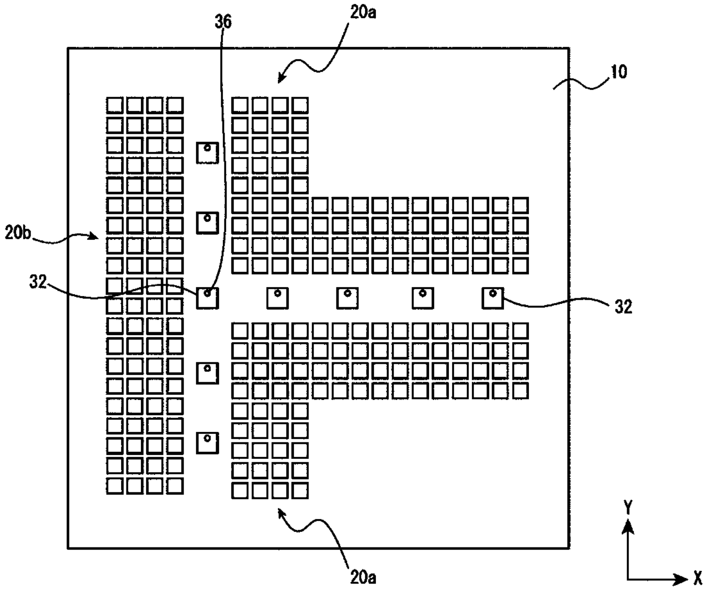
FIG. 10 is a plan view illustrating another example of the appearance configuration of the radio frequency module according to the embodiment of the present technique.

FIG. 10 is a plan view illustrating another example of the appearance configuration of the radio frequency module according to the embodiment of the present disclosure. As illustrated in the drawing, the radio frequency module 1 in this example includes the plurality of antenna elements 30 aligned in a T shape and includes meta material portions 20 formed in the vicinity of and along the alignment of the antenna elements 30.

In other words, the plurality of antenna elements 30 include a first antenna element group aligned in a line shape in the X direction and a second antenna element group aligned in a line shape in the Y direction that is orthogonal to the X direction. In this example, nine antenna elements 30 aligned in a T shape are provided with the antenna element 30 at the position at which the first antenna element group and the second antenna element group intersect each other at the center portion of the first antenna element group and at one end portion of the second antenna element group shared. Therefore, the shared antenna element 30 is located at the position deviating from the center of the interposer 10. The positions of the power supply points 36 on the patch electrodes 32 are determined at substantially equal distances from the EBG structures on both the sides as described above.

As for the meta material portions 20, the meta material portions 20 are formed in the vicinity of and along the plurality of antenna elements 30 aligned in the T shape. For example, the meta material portions 20 are configured to include two EBG structures 20*a* formed into L-shaped geometric patterns and one EBG structure 20*b* formed into a strip-shaped geometric pattern.

Figure 11A:
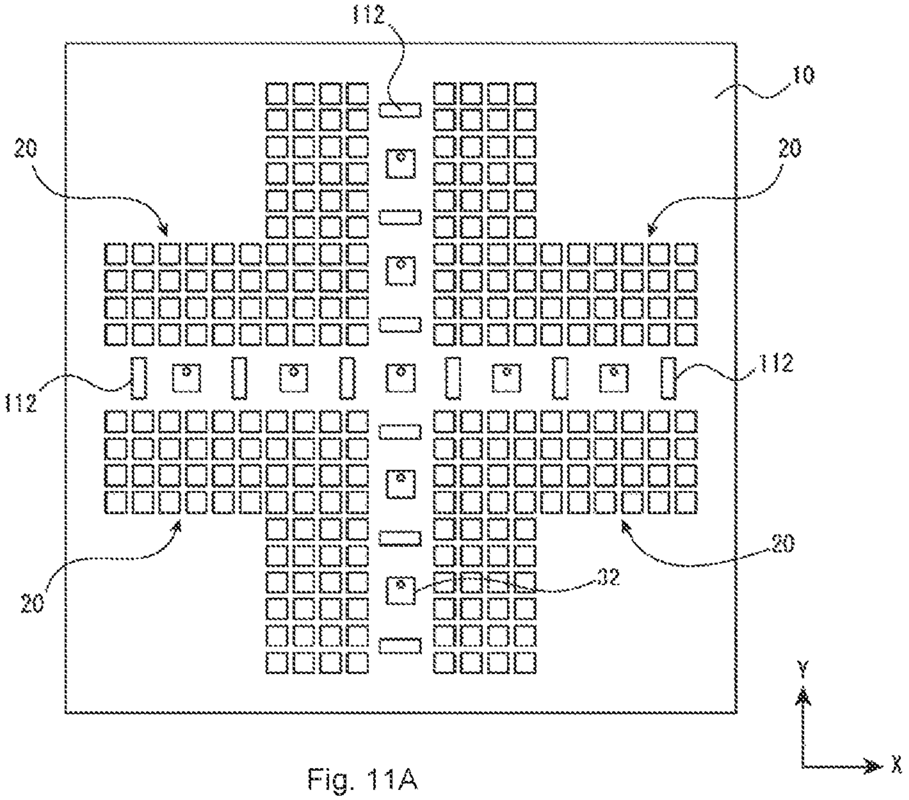
FIGS. 11A and 11B are plan views and a partial sectional view illustrating another example of the appearance configuration of the radio frequency module according to the embodiment of the present technique.
Figure 11B:
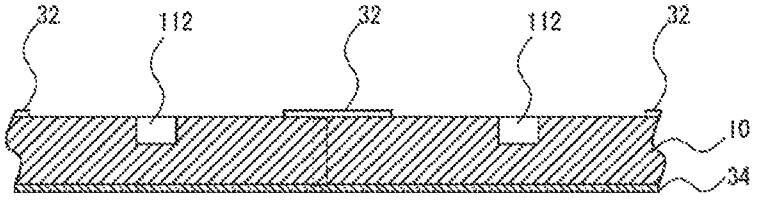

FIGS. 11A and 11B are diagrams illustrating another example of the appearance configuration of the radio frequency module according to the embodiment of the present technique, where FIG. 11A is a plan view illustrating another example of the appearance configuration of the radio frequency module, and FIG. 11B is a partial sectional view thereof. The radio frequency module 1 in this example has recessed portions 112 for forming air layers in the vicinity of the plurality of antenna elements 30.

In other words, the recessed portions 112 are formed in the vicinity of the patch electrodes 32 along the alignment direction of the patch electrodes 32. Although an example in which one recessed portion 112 is formed between the patch electrodes 32 is illustrated in the drawing, the present disclosure is not limited thereto, and a plurality of recessed portions 112 may be formed between the patch electrodes 32, for example. The recessed portions 112 are formed by cutting a part of the interposer 10 on the side of the first surface, for example. The shape and the size of the recessed portions 112 are appropriately determined in consideration of the antenna properties of the radio frequency module 1. In another example, the recessed portions 112 may be formed to surround the patch electrodes 32 although not illustrated in the drawing.

In this manner, the radio frequency module 1 can curb plane waves by forming the recessed portions 112 forming air layers in the interposer 10. Although electromagnetic radiation in the direction that is orthogonal to the alignment direction of the antenna elements 30 becomes stronger in a high-frequency domain, in particular, the recessed portions 112 formed in the vicinity of and along the alignment direction of the antenna elements 30 can curb electromagnetic radiation and can direct the direction of beam radiation to the upward direction. A result of simulation of such a radio frequency module 1 showed that electromagnetic radiation in the direction of 75 degrees was reduced by about −0.3 dBi and that the upward electromagnetic radiation was improved by about +0.2 dBi.

Figure 12:
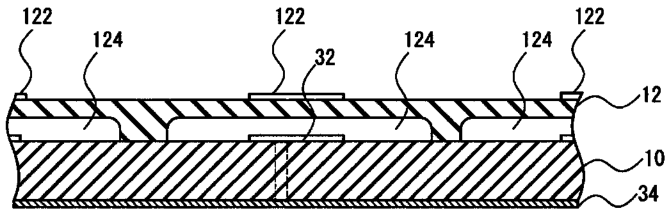
FIG. 12 is a partial sectional view illustrating another example of the configuration of the radio frequency module according to the embodiment of the present technique.

FIG. 12 is a partial sectional view illustrating another example of the appearance configuration of the radio frequency module according to the embodiment of the present technique. The radio frequency module 1 in this example is a micro-strip antenna having a structure in which non-power supply elements are mounted. Although not explicitly illustrated in the drawing, the radio frequency module 1 in this example also assumes the configuration including the plurality of antenna elements 30 and the meta material portions 20 as described above.

In other words, the radio frequency module 1 includes an additional interposer 12 placed on the first surface of the interposer 10 and a non-power supply element 122 formed on the first surface of the additional interposer 10 as illustrated in the drawing.

The additional interposer 12 forms a predetermined space between the patch electrodes 32 and the non-power supply element 122. The additional interposer 12 has recessed portions 124 for forming an air layer. The recessed portions 124 are formed to cover the patch electrodes 32. The additional interposer 12 is, for example, a glass interposer (GIP) similarly to the interposer 10.

The non-power supply element 122 does not have any power supply points unlike the patch electrodes 32. The non-power supply element 122 is formed to face the patch electrodes 32 via the recessed portions 124 on the first surface (front surface) of the additional interposer 12. The interval between the patch electrodes 32 and the non-power supply element 122 is appropriately determined in consideration of the antenna properties of the radio frequency module 1. In the present disclosure, the non-power supply element 122 is an aspect of the third electrode.

In this manner, the radio frequency module 1 can reduce an effective specific dielectric constant, can curb occurrence of plane waves, and can thus improve a gain by forming the recessed portions 112 forming the air layers on the interposer 10. A result of simulation showed that the gain of the radio frequency module 1 in this example was improved by about 1 dBi and was also improved up to about 17.2 dBi as compared with a radio frequency module with a structure that does not have the recessed portions 123.

Each of the aforementioned embodiments is an illustrative example for explaining the present technique, and the present technique is not intended to be limited only to these embodiments. The present technique can be implemented in various forms without departing from the gist thereof.

For example, the steps, the operations, or the functions of the method disclosed in the specification may be performed in parallel or in a different order unless conflicts occur in the result thereof. The described steps, operations, and the functions are provided as merely examples, and some of the steps, the operations, and the functions may be omitted or combined in one step, operation, and functions without departing from the gist of the invention, and other steps, operations, or functions may be added.

Also, although various embodiments have been disclosed in the specification, specific features (technical matters) in one of the embodiments may be added to a different embodiment with appropriate improvements or may be replaced with a specific feature in the different embodiment, and such an embodiment is also included within the gist of the present technique.

Also, the present technique may be configured to include the following technical matters.

(1) A radio frequency module including: an interposer; a plurality of antenna element groups that include first electrodes and a second electrode, and configured such that the first electrodes are aligned in line shapes in at least a first direction on a first surface of the interposer; and meta material portions that are provided at the interposer and affect electromagnetic properties of the plurality of antenna elements, in which the meta material portions include electromagnetic band gap structures provided by forming predetermined geometric patterns near both sides of the first electrodes along at least the first direction.

(2) The radio frequency module according to (1) above, in which each of the plurality of antenna elements has a power supply point at a position with an equivalent distance from end portions of the electromagnetic band gap structures provided near both the sides of the first electrodes.

(3) The radio frequency module according to (1) or (2) above, in which the plurality of antenna elements include a first antenna element group in which the first electrodes are aligned in line shapes in the first direction and a second antenna element group in which the first electrodes are aligned in line shapes in a second direction that is orthogonal to the first direction, and the first antenna element group and the second antenna element group share an antenna element at a mutually intersecting position.

(4) The radio frequency module according to any one of (1) to (3) above, in which the meta material portions further include electromagnetic band gap structures forming predetermined geometric patterns and provided near both the sides of the first electrodes along the second direction.

(5) The radio frequency module according to any one of (1) to (4) above, in which the first antenna element group and the second antenna element group are aligned in a cross shape sharing an antenna element at a position at which the first antenna element group and the second antenna element group intersect each other at a center portion.

(6) The radio frequency module according to any one of (1) to (4) above, in which the first antenna element group and the second antenna element group are aligned in an L shape sharing an antenna element at a position at which the first antenna element and the second antenna element group intersect each other at one end portion.

(7) The radio frequency module according to any one of (1) to (4) above, in which the first antenna element group and the second antenna element group are aligned in a T shape sharing an antenna element at a position at which the first antenna element group and the second antenna element group intersect at a center portion of one of the antenna groups and at one end of the other antenna group.

(8) The radio frequency module according to any one of (1) to (7) above, in which a predetermined active electron circuit element is arranged in a region formed by the electromagnetic band gap structure forming the predetermined geometric pattern on a distal side from the plurality of antenna elements.

(9) The radio frequency module according to any one of (1) to (8) above, in which an antenna element at the mutually intersecting position has a power supply point that is located on a virtual line connecting power supply points of one of the antenna groups and is located with a deviation from a virtual line connecting power supply points of the other antenna group.

(10) The radio frequency module according to (9) above, in which a signal having a phase with a deviation of 90 degrees with respect to a phase of a signal supplied to the power supply points of the other antenna element group is supplied to the power supply point of the antenna element at the mutually intersecting position.

(11) The radio frequency module according to any one of (1) to (9) above, in which the antenna element at the mutually intersecting position has a first power supply point located on a virtual line connecting power supply points of one of the antenna groups and a second power supply point located on a virtual line connecting power supply points of the other antenna group.

(12) The radio frequency module according to any one of (1) to (11) above, in which the interposer has a recessed portion for forming an air layer near the first electrodes.

(13) The radio frequency module according to any one of (1) to (12) above, in which the recessed portion is formed between the first electrodes at least along the first direction.

(14) The radio frequency module according to any one of (1) to (13) above, further including; an additional interposer that is laminated on the interposer and includes a recessed portion for forming an air layer; and a third electrode provided at the additional interposer, in which the third electrode is provided to face the first electrodes via the recessed portion.

(15) The radio frequency module according to any one of (1) to (14) above, in which a solid metal structure is included on a side of the second surface of the interposer.

(16) A wireless device including; a radio frequency module; and a wireless control circuit that is electrically coupled to the radio frequency module, in which the radio frequency module includes an interposer, a plurality of antenna elements that include first electrodes and a second electrode and are configured to include, on a first surface of the interposer, a first antenna element group in which the first electrodes are aligned in line shapes in a first direction and a second antenna element group in which the first electrodes are aligned in line shapes in a second direction that is orthogonal to the first direction, and meta material portions that are provided at the interposer and affect electromagnetic properties of the plurality of antenna elements, the meta material portions include electromagnetic band gap structures provided to form predetermined geometric patterns near both sides of the first electrodes of the plurality of antenna elements along each of the first direction and the second direction, the first antenna element group and the second antenna element group share an antenna element at a mutually intersecting position, the wireless control circuit includes a phase shifter that is electrically coupled to each of the plurality of antenna elements, and a control unit that controls the phase shifter such that phases of signals for the plurality of antenna elements are changed, and the control unit performs control such that a signal having a phase with a deviation of 90 degrees with respect to a phase of a signal to be supplied to power supply points of one of the antenna element groups is supplied to the power supply point of the antenna element at the mutually intersecting position.

REFERENCE SIGNS LIST

1 Radio frequency module
10, 12 Interposer
20 Meta material portion (EBG structure)
30 Antenna element
32 Patch electrode
34 Ground electrode
36 Power supply point
112 Recessed portion
122 Non-power supply element
124 Recessed portion
800 Wireless control circuit
810 Control IC
820 Power source
830 Phase shifter
840 Switch
850 Signal amplifier
860 Frequency modulator
870 Analog-digital converter
880 Digital-analog converter

The invention claimed is:

1. A radio frequency module, comprising:
a first interposer;
a plurality of antenna elements that includes a plurality of first electrodes and a second electrode, wherein
the plurality of first electrodes is on a first surface of the first interposer, and
the plurality of first electrodes is in a line arrangement in at least a first direction on the first surface; and
meta material portions at the first interposer, wherein
electromagnetic properties of the plurality of antenna elements are based on the meta material portions,
the meta material portions include electromagnetic band gap structures of specific geometric patterns on each of a first side of the line arrangement of the plurality of first electrodes and a second side of the line arrangement of the plurality of first electrodes, and
the first side of the line arrangement of the plurality of first electrodes is parallel to the second side of the line arrangement of the plurality of first electrodes.

2. The radio frequency module according to claim 1, wherein each of the plurality of antenna elements further includes a power supply point at an equivalent distance from end portions of the electromagnetic band gap structures.

3. The radio frequency module according to claim 1, wherein
the plurality of antenna elements corresponds to a first antenna element group and a second antenna element group,
the first antenna element group includes a first set of first electrodes of the plurality of first electrodes in the line arrangement in the first direction,
the second antenna element group includes a second set of first electrodes of the plurality of first electrodes in the line arrangement in a second direction, wherein the second direction is orthogonal to the first direction, and
the first antenna element group and the second antenna element group share a common antenna element at an intersection position of the first antenna element group and the second antenna element group.

4. The radio frequency module according to claim 3, wherein
the first antenna element group and the second antenna element group are in a cross shape alignment, and
the intersection position corresponds to a center portion of each of the first antenna element group and the second antenna element group.

5. The radio frequency module according to claim 3, wherein
the first antenna element group and the second antenna element group are in an L shape alignment, and
the intersection position corresponds to an end portion of one of the first antenna element group or the second antenna element group.

6. The radio frequency module according to claim 3, wherein
the first antenna element group and the second antenna element group are in a T shape alignment, and
the intersection position corresponds to a point of intersection of a center portion of the first antenna element group and an end portion of the second antenna element group.

7. The radio frequency module according to claim 3, further comprising a specific active electronic circuit element in a region corresponding to the electromagnetic band gap structures.

8. The radio frequency module according to claim 3, wherein
the common antenna element includes a specific power supply point on a first virtual line that connects a plurality of first power supply points of the first antenna element group, and
a location of the common antenna element is deviated from a second virtual line that connects a plurality of second power supply points of the second antenna element group.

9. The radio frequency module according to claim 8, wherein
a first signal includes a first phase with a deviation of 90 degrees with respect to a second phase of a second signal supplied to the plurality of second power supply points of the second antenna element group, and
the first signal is supplied to the specific power supply point of the common antenna element.

10. The radio frequency module according to claim 3, wherein the common antenna element includes:

a first specific power supply point on a first virtual line that connects a plurality of first power supply points of the first antenna element group; and a second specific power supply point on a second virtual line that connects a plurality of second power supply points of the second antenna element group.

11. The radio frequency module according to claim 1, wherein the first interposer includes a recessed portion in a vicinity of the plurality of first electrodes.

12. The radio frequency module according to claim 11, wherein the recessed portion is between the plurality of first electrodes.

13. The radio frequency module according to claim 1, further comprising:

a second interposer that is laminated on the first interposer, wherein the second interposer includes a recessed portion; and a third electrode at the second interposer, wherein the third electrode faces the plurality of first electrodes via the recessed portion.

14. The radio frequency module according to claim 1, further comprising a solid metal structure on a second surface of the first interposer.

15. A wireless device, comprising:

a radio frequency module; and a wireless control circuit that is electrically coupled to the radio frequency module, wherein the radio frequency module includes:

an interposer, a plurality of antenna elements that includes a plurality of first electrodes and a second electrode, wherein the plurality of first electrodes is on a surface of the interposer, the plurality of antenna elements corresponds to a first antenna element group and a second antenna element group, the first antenna element group includes a first set of first electrodes of the plurality of first electrodes in a line arrangement in a first direction, the second antenna element group includes a second set of first electrodes of the plurality of first electrodes in the line arrangement in a second direction, the second direction is orthogonal to the first direction, and the first antenna element group and the second antenna element group include a common antenna element at an intersection position of the first antenna element group and the second antenna element group, and meta material portions at the interposer, wherein electromagnetic properties of the plurality of antenna elements are based on the meta material portions, and the meta material portions include electromagnetic band gap structures of specific geometric patterns, on each of a first side of the line arrangement of the plurality of first electrodes and a second side of the line arrangement of the plurality of first electrodes, the wireless control circuit includes:

a phase shifter electrically coupled to each of the plurality of antenna elements; and a control unit configured to:

control the phase shifter to change phases of signals for the plurality of antenna elements; and control deviation of a phase of a first signal by 90 degrees with respect to a phase of a second signal supplied to a plurality of second power supply points of one of the first antenna element group or the second antenna element group, wherein the first signal is supplied to a specific power supply point of the common antenna element.

* * * * *